United States Patent [19]
Yamamuro

[11] Patent Number: 5,959,954
[45] Date of Patent: *Sep. 28, 1999

[54] INFORMATION RECORDING/ REPRODUCING APPARATUS WITH VARIABLE RATE OF REVOLUTION AND DATA CLOCK FREQUENCY

[75] Inventor: Mikio Yamamuro, Yokohama, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/623,832

[22] Filed: Mar. 29, 1996

[30] Foreign Application Priority Data

Aug. 8, 1995 [JP] Japan ................................ 7-202083

[51] Int. Cl.$^6$ ........................................................ G11B 7/00
[52] U.S. Cl. .................................................. 369/47; 369/50
[58] Field of Search ................................. 369/50, 47, 48, 369/58; 360/73.03, 73.05, 73.08

[56] References Cited

U.S. PATENT DOCUMENTS

| | | | |
|---|---|---|---|
| 4,546,461 | 10/1985 | Isobe . | |
| 4,558,375 | 12/1985 | Sontheimer . | |
| 4,885,644 | 12/1989 | Ishii et al. | 369/50 |
| 5,136,560 | 8/1992 | Hangai et al. . | |
| 5,265,081 | 11/1993 | Shimizume et al. | 369/48 |
| 5,278,814 | 1/1994 | Deguchi et al. | 369/47 |
| 5,377,178 | 12/1994 | Saito et al. | 360/77.08 |
| 5,446,724 | 8/1995 | Tabe et al. | 369/48 |
| 5,463,604 | 10/1995 | Naito | 369/50 |
| 5,568,467 | 10/1996 | Inagaki et al. | 369/48 |
| 5,687,148 | 11/1997 | Vemura | 369/50 |

FOREIGN PATENT DOCUMENTS

| | | |
|---|---|---|
| 0 599 628 A2 | 6/1994 | European Pat. Off. . |
| 7-093893 | 4/1995 | Japan . |
| 7-098876 | 4/1995 | Japan . |

OTHER PUBLICATIONS

Patent Abstracts of Japan 02101678, publication date Apr. 13, 1990, RE Application No. 63252401, dated Jun. 10, 1988, Matsushita Electric Ind. Co. Ltd., Inventor: Iizuka Hiroyuki "Optical Disk".

Patent Abstracts of Japan 61099989, publication date May 19, 1986, RE Application 59219676, dated Oct. 19, 1984, Sony Corp, Inventor: Taniyama Masao; "Disk Recording and Reproducing Device."

*Primary Examiner*—Thang V. Tran
*Attorney, Agent, or Firm*—Pillsbury Madison & Sutro LLP

[57] ABSTRACT

A data processing apparatus comprising a motor for revolving a disc-shaped recording medium by a given rate of revolution signal, a mechanism for storing data in and reproducing data from a specific region of the recording medium in response to a data storing/reproducing frequency signal, a circuit for selecting a constant mode or variable mode for the rate of revolution signal and supplying it to the motor, and a circuit for selecting a constant mode or variable mode for the frequency signal and supplying it to the storing/reproducing mechanism.

2 Claims, 7 Drawing Sheets

| 77 | 78 | 79 | 80 |
|---|---|---|---|
| GROUP 1 ZONE 0~7 RATE OF REVOLUTION R, 2600rpm CAPACITY 6448742408 CLOCK F 30~42MHz | GROUP 2 ZONE 8~13 RATE OF REVOLUTION R, 1764.93rpm CAPACITY 6488064008 CLOCK F 30~36MHz | GROUP 3 ZONE 14~18 RATE OF REVOLUTION R, 1421.70rpm CAPACITY 6488063608 CLOCK F 30~33.9MHz | GROUP 4 ZONE 19~23 RATE OF REVOLUTION R, 1223.64rpm CAPACITY 7253139208 CLOCK F 30~33.3MHz |
| RADIAL DISTANCE (mm) 11.866 | 8.5248 | 7.104 | 6.99744 |

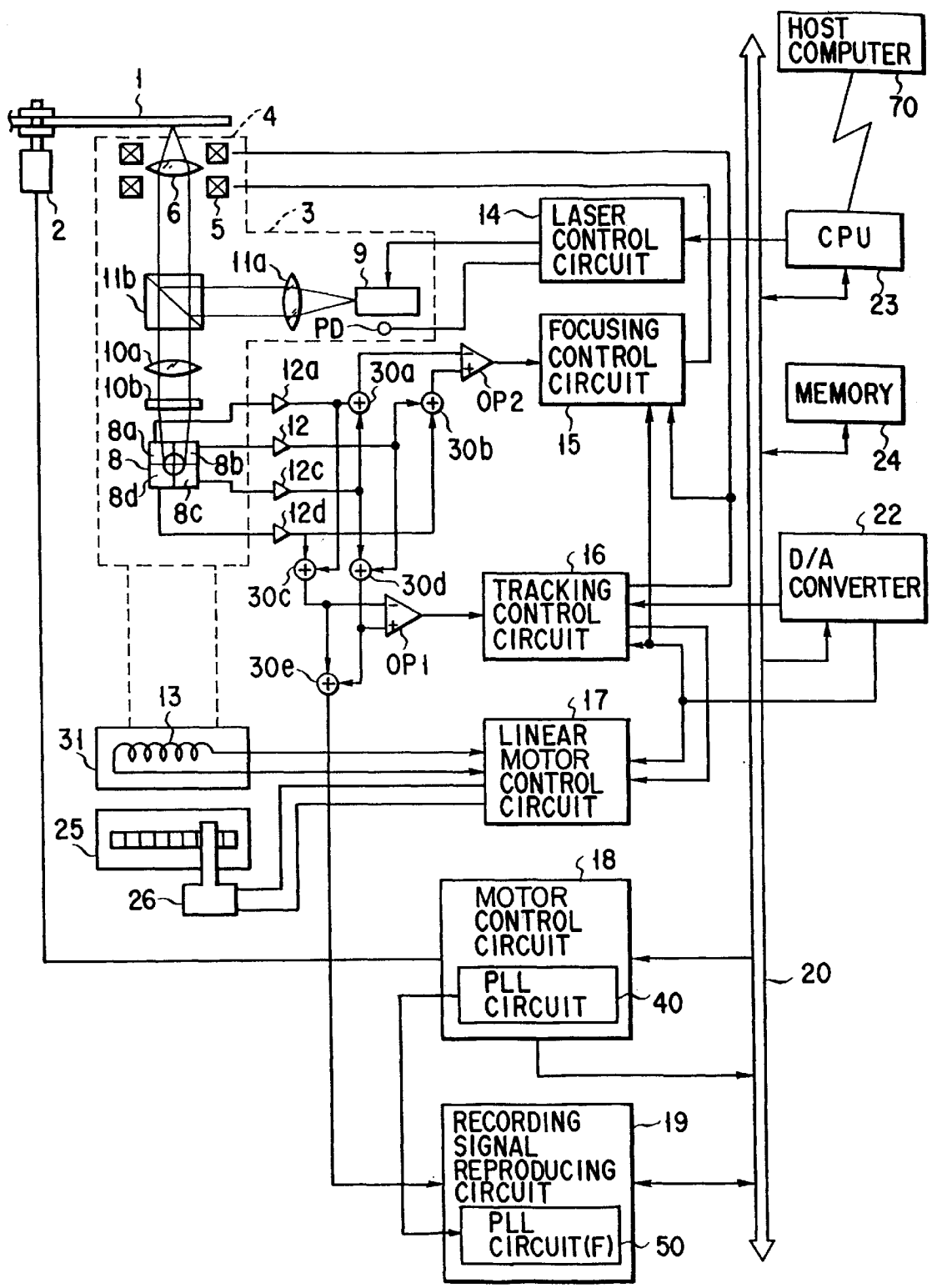
F I G. 1

| ZONE | SECTOR/TRACK | STARTING RADIAL POSITION | NUMBER OF TRACKS | NUMBER OF SECTORS | BYTE CAPACITY | RATE OF REVOLUTION R(r.p.m) | DEVIATION OF REVOLUTION(%) |
|---|---|---|---|---|---|---|---|
| 0 | 17 | 24000.000 | 1920 | 32640 | 66846720 | 2600.00 | — |
| 1 | 18 | 25420.800 | 1920 | 34560 | 70778880 | 2454.68 | 5.589 |
| 2 | 19 | 26841.600 | 1920 | 36480 | 74711040 | 2324.75 | 5.293 |
| 3 | 20 | 28262.400 | 1920 | 38400 | 78643200 | 2207.88 | 5.027 |
| 4 | 21 | 29683.200 | 1920 | 40320 | 82575360 | 2102.20 | 4.787 |
| 5 | 22 | 31104.000 | 1920 | 42240 | 86507520 | 2006.17 | 4.568 |
| 6 | 23 | 32524.800 | 1920 | 44160 | 90439680 | 1918.54 | 4.368 |
| 7 | 24 | 33945.600 | 1920 | 46080 | 94371840 | 1838.24 | 4.186 |
| 8 | 25 | 35366.400 | 1920 | 48000 | 98304000 | 1764.39 | 4.017 |
| 9 | 26 | 36787.200 | 1920 | 49920 | 102236460 | 1696.24 | 3.862 |
| 10 | 27 | 38208.000 | 1920 | 51840 | 106468320 | 1633.17 | 3.719 |
| 11 | 28 | 39628.800 | 1920 | 53760 | 110100480 | 1574.61 | 3.585 |
| 12 | 29 | 41049.600 | 1920 | 55680 | 114032640 | 1520.11 | 3.461 |
| 13 | 30 | 42470.400 | 1920 | 57600 | 117964800 | 1421.70 | 3.345 |
| 14 | 31 | 43891.200 | 1920 | 59520 | 121896960 | 1377.12 | 3.237 |
| 15 | 32 | 45312.000 | 1920 | 61440 | 125829120 | 1335.25 | 3.136 |
| 16 | 33 | 46732.800 | 1920 | 63360 | 129761280 | 1295.85 | 3.040 |
| 17 | 34 | 48153.600 | 1920 | 65280 | 133693440 | 1258.71 | 2.951 |
| 18 | 35 | 49574.400 | 1920 | 67200 | 141557760 | 1223.64 | 2.866 |
| 19 | 36 | 50995.200 | 1920 | 69120 | 145489920 | 1190.48 | 2.876 |
| 20 | 37 | 53416.000 | 1920 | 71040 | 149422080 | 1159.06 | 2.711 |
| 21 | 38 | 53836.800 | 1920 | 72960 | 153354240 | 1129.26 | 2.639 |
| 22 | 39 | 55257.600 | 1920 | 74880 | 145489920 | 1100.95 | 2.571 |
| 23 | 40 | 56678.400 | 1776 | 71040 | 66846720 | 2600.00 | 2.507 |
| LEAD-OUT | | 57992.640 | | | | | |
| TOTAL | | | 45936 | 1307520 | 267780960 | USER DATA TRANSPORT RATE | 12.0Mbps |

| ZONE | SECTOR/TRACK | STARTING RADIAL POSITION | TRACK ZONE | NUMBER OF SECTORS | BYTE CAPACITY | RATE OF REVOLUTION R (r.p.m) | CLOCK FREQUENCY F (Hz) |
|---|---|---|---|---|---|---|---|
| 20 | 37 | 52416.000 | 1920 | 71040 | 145489920 | 1190.48 | 30000000 |
| 21 | 38 | 53836.800 | 1920 | 72960 | 149422080 | 1190.48 | 30813187 |
| 22 | 39 | 55257.600 | 1920 | 74880 | 153354240 | 1190.48 | 31626374 |
| 23 | 40 | 56678.400 | 1776 | 71040 | 145489920 | 1190.48 | 32439560 |
| TOTAL | | | | | 593756160 | | |

} B

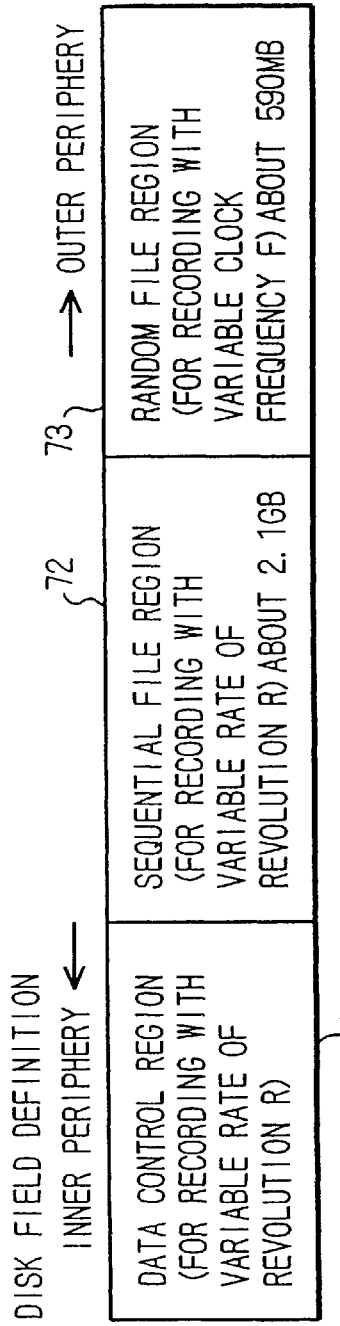

FIG. 5

DISK FIELD DEFINITION
INNER PERIPHERY ⟶ ⟶ OUTER PERIPHERY

71 — DATA CONTROL REGION (FOR RECORDING WITH VARIABLE RATE OF REVOLUTION R)

72 — SEQUENTIAL FILE REGION (FOR RECORDING WITH VARIABLE RATE OF REVOLUTION R) ABOUT 2.1GB

73 — RANDOM FILE REGION (FOR RECORDING WITH VARIABLE CLOCK FREQUENCY F) ABOUT 590MB

⟵------ ABOUT 6mm ------⟶

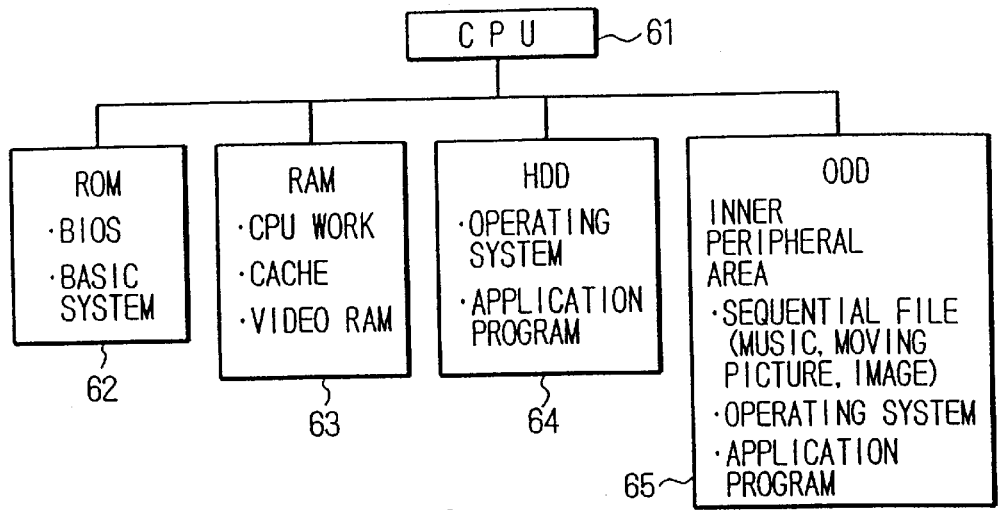
FIG. 6
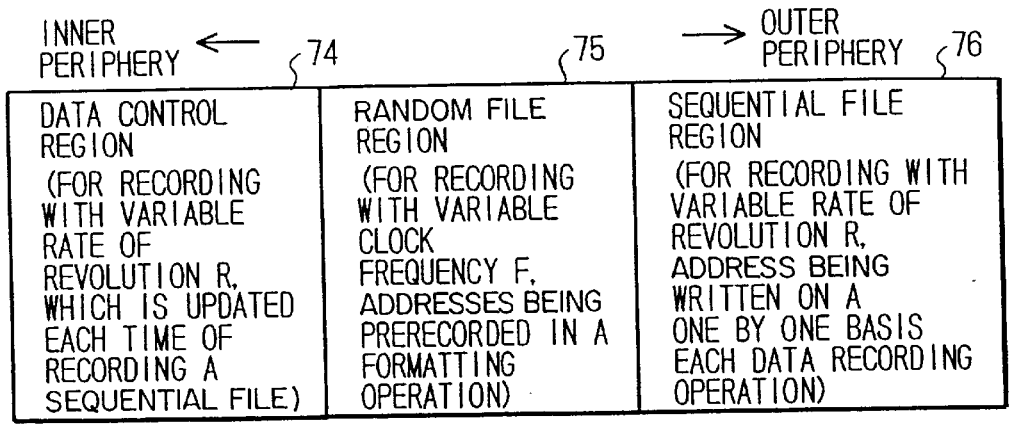
FIG. 7
| GROUP 1 | GROUP 2 | GROUP 3 | GROUP 4 |
|---|---|---|---|
| ZONE 0~7 | ZONE 8~13 | ZONE 14~18 | ZONE 19~23 |
| RATE OF REVOLUTION R, 2600rpm | RATE OF REVOLUTION R, 1764.93rpm | RATE OF REVOLUTION R, 1421.70rpm | RATE OF REVOLUTION R, 1223.64rpm |
| CAPACITY 6448742408 | CAPACITY 6488064008 | CAPACITY 6488063608 | CAPACITY 7253139208 |
| CLOCK F 30~42MHz | CLOCK F 30~36MHz | CLOCK F 30~33.9MHz | CLOCK F 30~33.3MHz |
RADIAL DISTANCE (mm)
11.866    8.5248    7.104    6.99744
FIG. 8

INFORMATION RECORDING/ REPRODUCING APPARATUS WITH VARIABLE RATE OF REVOLUTION AND DATA CLOCK FREQUENCY

BACKGROUND OF THE INVENTION

1. Field of the Invention

This invention relates to an information recording/ reproducing apparatus such as an optical disc drive for recording information on and retrieving stored information from an information recording medium, or an optical disc, that is provided with sectors having a header section and a data section and arranged in a specific recording format such as CAV, CLV or MCAV and it also relates to an information recording medium to be used for such an apparatus.

2. Description of the Related Art

There are already known and put to practical use a variety of information recording/reproducing apparatuses for recording information on and retrieving stored information from an optical disc (information recording medium) having recording tracks by means of a laser beam emitted from a semiconductor laser disposed in an optical head.

Formats that are currently available for recording information on an information recording medium by means of an optical disc drive include CAV (constant angular velocity), CLV (constant liner velocity) and MACV (modified constant angular velocity). Of these, CLV and MCAV have much in common in that data are stored on a recording medium at a substantially uniform data density. With the CLV format, the optical disc is rotated at a rate of revolution that varies as a function of the distance from the center of the disc of the location where data is currently being recorded, whereas, with the MCAV format, the data clock frequency used for recording data is made to vary. It may be safe to say that CLV is adapted to recording music or moving pictures because a constant data clock frequency is involved, whereas any specific piece of information stored on an optical data can be accessed very quickly with MCAV because the disc is rotated at a constant rate and no change is involved in the rate of revolution of the disc.

However, these techniques are also accompanied by certain drawbacks. No large capacity for storing information can be realized with CAV, while CLV has a drawback of baffling any attempt for quick and frequent random access because the rate of revolution changes constantly. With MCAV, on other hand, the maximum value of the data clock frequency F to be used for recording and reproducing information is limited by the information recording/ reproducing performance of the signal processing circuit of the apparatus so that, while the operation of recording or reproducing data may be quickly conducted in a peripheral area of the disc, it may not so in an inner area.

As summarized above, any of the known information recording formats of CAV, CLV and MCAV cannot satisfy the users of information recording/reproducing apparatuses of the type under consideration particularly in terms of capacity and performance because CAV cannot provide a large capacity and CLV is not capable of adapting itself to quick and frequent random access, while MCAV is not adapted to recording music or moving pictures because the operation of recording or reproducing data cannot be conducted in an inner area of the optical disc as the maximum value of the data clock frequency to be used for recording and reproducing information is limited by the information recording/reproducing performance of the signal processing circuit of the apparatus, although it may be conducted quickly in a peripheral area of the disc.

SUMMARY OF THE INVENTION

Therefore, it is the object of the present invention to provide an information recording/reproducing apparatus that can use a selected information recording format that meets the capacity related requirements of recording operation as well as an information recording medium that can be used for such an apparatus.

According to the invention, the above object is achieved by providing a data processing apparatus comprising: means for revolving a disc-shaped recording medium by a given rate of revolution signal; means for storing data in and reproducing data from a specific region of the recording medium in response to a data storing/reproducing frequency signal; means for selecting a constant rate of revolution or a variable rate of revolution and supplying it to the revolving means; and means for selecting a constant frequency signal or a variable frequency signal and supplying it to the storing/reproducing means.

Thus, a data processing apparatus according to the invention differs from known conventional apparatuses of the category under consideration with which either the rate of revolution or the data recording/reproducing frequency is held constant of the recording medium used there is made variable while the other is held constant. According to the invention, the recording medium is divided into a plurality of storage regions and, for example, a recording medium is rotated at a variable rate of revolution for a first region while the data recording/reproducing frequency to be used for the region is made constant. Then, the recording medium is rotated at a constant rate of revolution for a second region that is separated from the first region while the data recording/reproducing frequency to be used for the region is made variable. With such an arrangement, the memory capacity of the optical disc is fully exploited and, at the same time, a same processing speed can be maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram schematically illustrating a first embodiment of information recording/reproducing apparatus according to the invention, which is an optical disc drive;

FIGS. 4A and 4B are charts showing the arrangements of tracks and sectors on an optical disc that can be used for a first embodiment of the invention;

FIG. 5 is a schematic illustration showing how regions are defined on an optical disc that can be used for the first embodiment of the invention;

FIG. 6 schematically illustrates how an optical disc 1 according to the invention may be utilized for a personal computer system;

FIG. 7 is a schematic illustration showing how regions are defined on an optical disc for a second embodiment of the invention;

FIG. 8 is a schematic illustration showing how the memory of an optical disc is divided into a total of four groups (volumes)

DETAILED DESCRIPTION OF THE PREFERRED EMBODIMENTS

Figure 2:
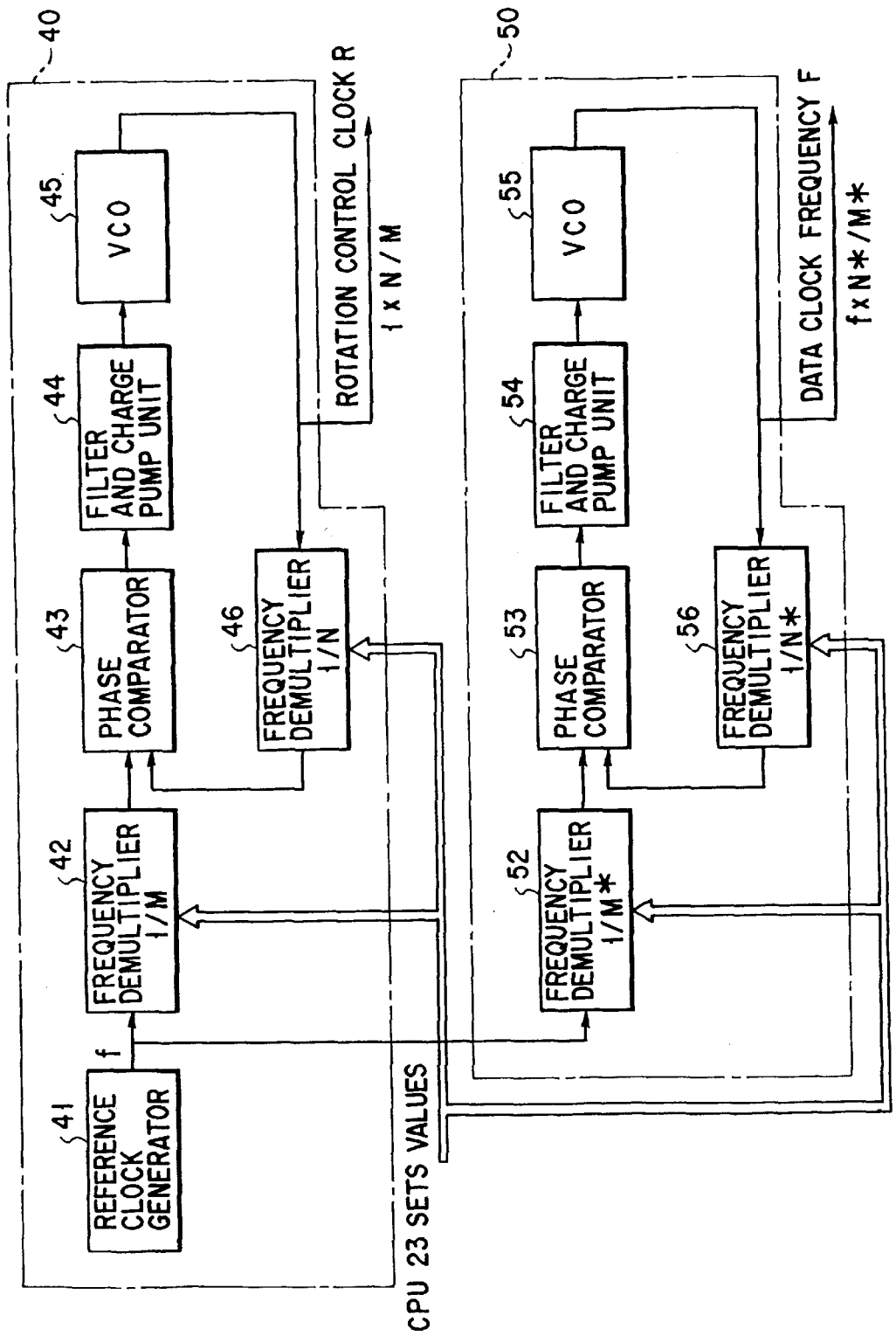
FIG. 2 is a block diagram showing the circuit configuration of two PLL circuits.

Now, the invention will be described in greater detail by referring to the accompanying drawings and the preferred embodiments of the invention.

FIG. 1 is a block diagram schematically illustrating a first embodiment of information recording/reproducing apparatus according to the invention, which is an optical disc drive for recording information on or reproducing information from an optical disc (information recording medium) 1 by means of a beam of focused light. The optical disc drive is connected to a host computer 70 that gives commands to the apparatus on the format with which the optical disc drive records information on the optical disc.

The optical disc 1 has, on the surface, a spiral groove (recording track) and is driven to revolve, for instance, at a given rate of revolution by at motor (rotary drive means) 2, which is controlled by a motor control circuit 18 for its operation.

The optical disc 1 is typically made of glass or synthetic resin and carries on the surface an annular metal coating layer, or a recording layer, which is typically made of tellurium or bismuth. The metal coating layer has a notch or a positional reference mark at a position along the inner peripheral thereof.

Information is recorded on and reproduced from the optical disc 1 by means of an optical head (information reading means) 3, which is secured to a drive coil 13 that constitutes a movable member of a linear motor 31 and is connected to a linear motor control circuit 17.

The linear motor control circuit 17 is connected to a linear motor position detector 26, which produces a positional signal upon obtaining a reading for a specific position on an optical scale 25 arranged on the optical head 3.

The linear motor 31 comprises, as a stationary member, a permanent magnet (not shown) such that the optical head 3 is moved along a radial direction of the optical disc 1 as the drive coil 13 is magnetically excited by the linear motor control circuit: 17.

An objective lens 6 is held to the optical head 3 by means of a wire or a leaf spring (not shown) in such a way that it may be moved along the optical axis of the lens for focusing by a drive coil 5 and also along a direction perpendicular to the optical axis of the lens for tracking by another drive coil 4.

A laser beam emitted from a semiconductor laser oscillator (or an argon-neon laser oscillator) 9 that is driven to operate by a laser control circuit 14 is irradiated on the optical disc 1 by way of a collimator lens 11a, a half prism 11b and an objective lens 6 and the beam reflected by the optical disc 1 is; led to a photodetector 8 by way of the objective lens 6, the half prism 11b, a focusing lens 10a and a cylindrical lens 10b.

The photodetector 8 comprises quadripartite photodetector cells 8a, 8b 8c and 8d.

The output signal of the photodetector cell 8a of the photodetector 8 is fed to one of the terminals of an adder 30a by way of an amplifier 12a and that of the photodetector cell 8b is fed to one of the terminals of another adder 30b by way of another amplifier 12b, while the output signal of the photodetector cell 8c is fed to the other terminal of the adder 30a by way of still another amplifier 12c and that of the photodetector cell 8d is fed to the other terminal of the adder 30b by way of still another amplifier 12d.

The output signal of the adder 30a is fed to the inverting input terminal of a differential amplifier OP2 and that of the adder 30b is fed to the non-inverting input terminal of the differential amplifier OP2. With this arrangement, the differential amplifier OP2 feeds a focusing control circuit 15 with a focal point signal as a function of the difference between the output of the adder 30a and that of the adder 30b. The output signal of the focusing control circuit 15 is fed to the focusing drive coil 5 to control the emission of laser beam so that the emitted Laser beam is constantly and exactly focused on the optical disc 1.

The output signal of the adder 30c is fed to the inverting input terminal of the differential amplifier OP1 and that of the adder 30d is fed to the non-inverting input terminal of the differential amplifier OP1. With this arrangement, the differential amplifier OP1 feeds a tracking control circuit 16 with a tracking differential signal as a function of the difference between the output of the adder 30c and that of the adder 30d. The tracking control circuit 16 generates a track drive signal according to the track differential signal fed from the differential amplifier OP1.

The track drive signal produced by the tracking control circuit 16 is fed to said drive coil 4 for driving the objective lens along the tracking direction. The track differential signal fed to the tracking control circuit 16 is then fed further to a linear motor control circuit 17.

The signal representing the sum of the outputs of the photodetector cells 8a through 8d of the photodetector 8 after completing a set of focusing and tracking operations, or the output signal of adder 30ethat receives the output signal of the adder 30c and that of the adder 30d, therefore reflects the change in the reflectivity of a specific pit (storing information) on a specific track. This signal is supplied to a recorded signal reproducing circuit 19, which reproduces the address data (the track number, the sector number, etc.) as preformatted data of the pit along with the information stored there.

While the tracking control circuit 16 is moving the objective lens 6, the linear motor control circuit 17 moves the linear motor 31 or the optical head 3 so that the objective lens may be located close to the center of the optical head 3.

The optical disc drive further comprises a D/A converter 22 so that CPU 23 may exchange information with the focusing control circuit 13, the tracking control circuit 16 and the linear motor control circuit 17 and a memory 24 for storing data to be reproduced or recorded on a temporary basis and also programs necessary for certain processing operations.

The laser control circuit 14, the focusing control circuit, the focusing control circuit 15, the tracking control circuit 16, the linear motor control circuit 17, the motor control circuit 18 and the recorded signal reproducing circuit 19 as well as other component circuits are controlled by the CPU 23 by way of a bus line 20.

The motor control circuit 18 is provided in the inside with a PLL circuit 40 for generating a revolution control clock that operates as a reference clock for controlling the revolution of the motor 2. The recorded signal reproducing circuit 19 also has in the inside a PLL circuit 50 for generating a data clock that operates as a reference clock for reproducing the signal read out of the optical disc 1.

FIG. 2 is a block diagram showing the configuration of the two PLL circuits 40 and 50 designed to operate as clock signal generating means.

More specifically, the PLL circuit 40 comprises a reference clock generator 41, a frequency demultiplier (1/M) 4, a phase comparator 43, a filter and charge pump unit 44, a VCO (voltage controlled oscillator) 45 and another frequency demultiplier (1/N) 46. On the other hand, the PLL circuit 50 comprises a frequency demultiplier(l/M*) 52, a phase comparator 5:3, a filter and charge pump unit 54, a VCO 55 and another frequency demultiplier (1/N*) 56.

Note that the reference clock generated by the reference clock generator 41 is also fed to the frequency demultiplier 52 of the PLL circuit. 50.

The reference clock generator 41 generates a reference clock as an output of an oscillator having a stable oscillation frequency such as a quartz-crystal oscillator.

The frequency demultipliers 42 and 52 are circuits that divide the frequencies of the respective reference clocks by M and M* (or multiply by 1/M and 1/M*).

The phase comparators 43 and 53 compare different phases.

Each of the filter and charge pump units 44 and 54 comprises a filter circuit and a charge pump circuit.

The VCOs 45 and 55 are oscillators that. vary the oscillation frequency according the input voltage applied thereto.

The frequency demultipliers 45 and 56 are circuits that divide the frequencies of the respective reference clocks by N and N* (or multiply by 1/N and 1/N*).

The frequency of the reference clock generated by the reference clock generator 41 is divided by the frequency demultiplier 42 into a 1/M thereof and compared for phase by the phase comparator 43 with a 1/N of the frequency produced by the frequency demultiplier 46 and the result of the comparison is converted into a voltage by the filter and charge pump unit 44, which is then applied to the VCO 45 to control the oscillation frequency of the VCO 45, which then produces a revolution control clock. The revolution control clock is also applied to the frequency demultiplier 46 and its frequency is divided into a 1/N thereof by the frequency demultiplier 46. The divided frequency is then fed to the phase comparator 43 for comparison.

The frequency of the reference clock generated by the reference clock generator 41 is divided by the frequency demultiplier 52 into a 1/M* thereof and compared for phase by the phase comparator 53 with a 1/N* of the frequency produced by the frequency demultiplier 56 and the result of the comparison is converted into a voltage by the filter and charge pump unit 54, which is then applied to the VrCO 55 to control the oscillation frequency of the VCO 45, which then produces a data clock having a frequency of f. The data clock is also applied to the frequency demultiplier 56 and its frequency is divided into a 1/N* thereof by the frequency demultiplier 56. The divided frequency is then fed to the phase comparator 53 for comparison.

As a result of the above operations, the frequency f of the reference clock is converted into a frequency of f×N/M by the PLL circuit 40 for a revolution control clock, whereas it is converted into a frequency of f×N*/M* by the PLL circuit 50 for a data clock.

As the CPU 23 set values for M, M*, N and N* according to predetermined operational procedures, a set of a revolution control clock and a data. clock frequency F appropriate for the zone to be used for information recording and reproducing are determined.

The CLV or MCAV format is selectively used for recording information on the optical disc 1 so that a constant recording density may be maintained on the optical disc 1 to allow the latter to show a large recording capacity. The format of operation of the recording apparatus is determined according to the type of information handled by the host computer 70. For instance, the CLV format is used for high speed and continuous data signals such as music signals and moving picture signals as it is adapted to vary the rate of revolution of the optical disc 1 to record signals on or reproducing signals from a certain recording region of the optical disc 1. On the other hand, the data to be handled are those that are to be randomly accessed such as data on an operating system or an application system, the MCAV format is selected for recording data on or retrieving data from a certain recording region of the optical disc 1 as it does not involve any change in the rate of revolution of the optical disc 1 and only the data clock frequency F is changed.

Figure 3:
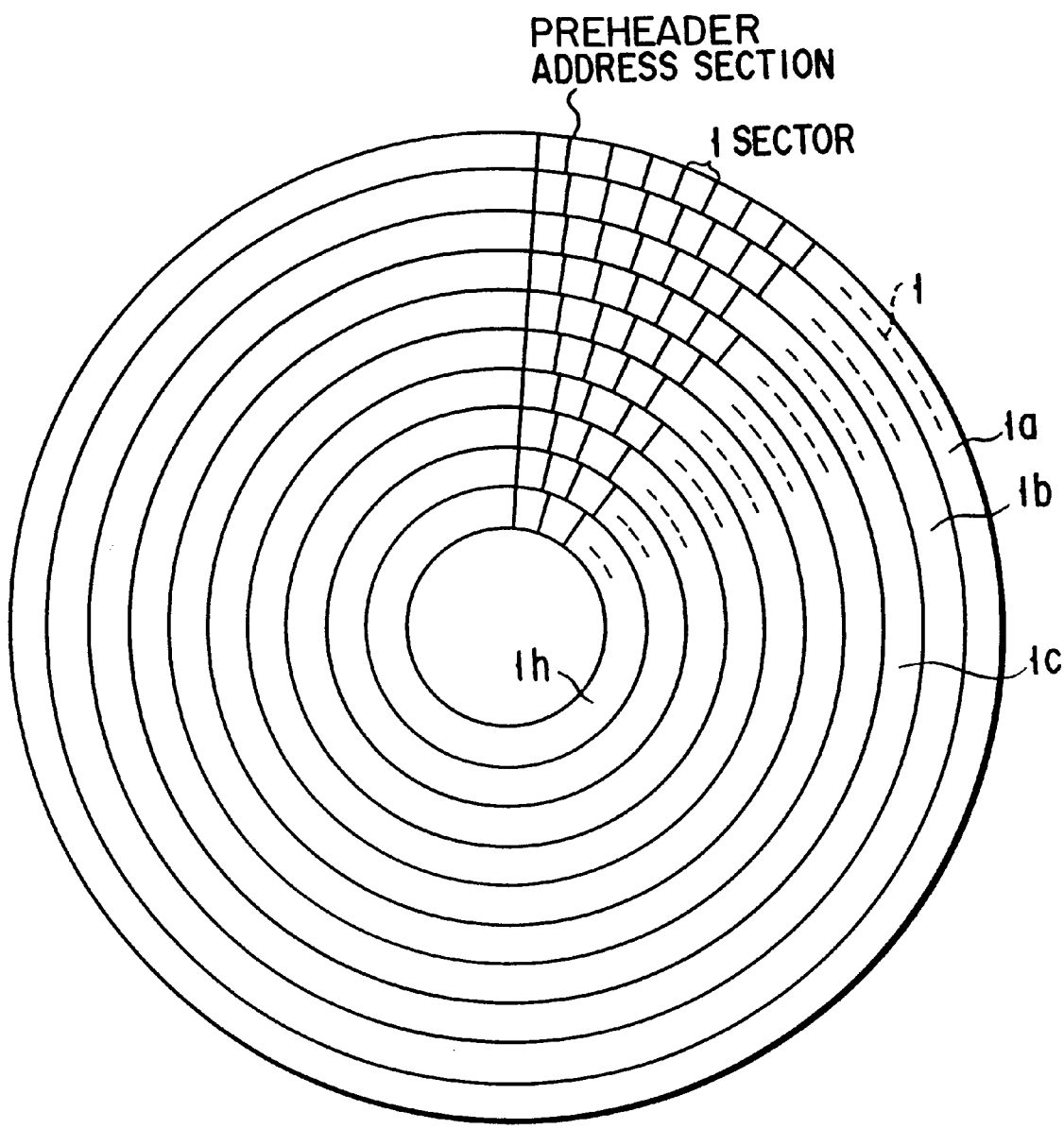
FIG. 3 is a schematic illustration of the MCAV recording format to be used on an optical disc.

FIG. 3 is a schematic illustration of the MCAV recording format to be used on an optical disc 1. The recording surface of optical disc 1 is radially divided into a plurality of (e.g., ten or twenty four) zones or tracks 1a, 1b, 1c, . . . , 1h that have sectors, the number of which differs from track to track. The relationships of the numbers of sectors of the tracks are expressed by the following formula.

The number of sectors of Zone 1a > the number of sectors of Zone 1b > the number of sectors of Zone 1c >. . . > the number of sectors of Zone 1h.

FIGS. 4A and 4B are charts showing the arrangements of tracks and sectors on an optical disc 1 that can be used for a first embodiment of the invention. With the arrangement of FIG. 4A, the recording surface of the optical disc 1 is divided into 24 zones that are disposed with a substantially constant pitch and each of the zones contains recording units, or sectors, arranged according to the CAV format so that information is recorded and reproduced with a constant rate of revolution R and a constant data clock frequency F within a zone.

If a data recording or reproducing operation covers two or more than two zones, either the rate of revolution R or the data clock frequency F has to be changed on a zone by zone basis. Note that the rate of revolution R is varied but the data clock frequency F is held constant in Region A comprising Zones 0 through 19 in the chart of FIG. 4A, whereas the rate of revolution R is held constant but the data clock frequency F is varied (within the range between 30 MHz and 32 MHz) in Region B comprising Zones 20 through 23.

FIG. 5 is a schematic illustration showing how regions are defined on an optical disc 1 that can be used for the first embodiment of the invention.

Group A of zones has a large capacity, which is about 2.1 G.B, and comprises regions 72 for recording and reproducing so-called sequential files with a variable rate of revolution R. Sequential files to be recorded and reproduced here may contain a large quantity of continuous data on music, moving pictures and/or the like.

Group B of zones has a relatively small capacity, which is about 590 MB, and is contained within a relatively small area having a radial length of about 6 mm and located close to the outer periphery of the optical disc 1. This area comprises regions 73 for recording and reproducing so-called random files with a constant rate of revolution R but variable data clock frequency F to realize a constant recording density. Random files to be recorded and-reproduced here may contain data on operating systems, application systems and/or the like.

Since Group B of zones is located close to the outer periphery of the optical disc 1 to reduce its radial length, the variable range of the data clock frequency F is relatively small to reduce the distance for the optical head to move at a stroke and hence the time required to access any target zone.

As described earlier, the embodiment of optical disc drive according to the invention comprises two different PLL circuits (clock generators) 40 and 50.

The PLL circuit 40 generates revolution control clocks for controlling the revolution of the optical disc. It varies the clock frequency as a function of the radial position of the target zone if the operation of data recording or reproducing is conducted with a variable rate of revolution.

The PLL circuit 50 generates data clock frequencies F. It varies the clock frequency F as a function of the radial position of the target zone if the operation of data recording or reproducing is conducted with a variable clock frequency F.

FIG. 6 schematically illustrates how an optical disc 1 according to the invention may be utilized for a personal computer system. The illustrated personal computer system comprises a CPU 61, a ROM unit 62 for storing BOISs and basic systems, a RAM unit 63 for storing works of the CPU 61, caches, video RAMs and so on, a hard disc drive (HDD) unit 64 that uses hard discs for storing operating systems and application programs and an optical disc drive unit 65.

For example, the CPU 61 may utilize an inner peripheral area of the optical disc 1 on the optical disc drive 65 for storing sequential files (for music, moving pictures and/or other images) and an outer peripheral area for storing operating systems and application programs.

With the above described arrangement, the optical disc 1 may suitably replace a conventional hard or floppy disc.

While a down-sized personal computer system is not capable of carrying a large capacity hard disc and an auxiliary unit such as a floppy disc drive has to be installed to cope with the problem of poor data storage capacity and establishing a specific operating environment for the user, although a floppy disc drive does not provide a sufficiently large data storage capacity and does not operate quickly.

With an optical disc drive according to the invention, an optical disc 1 is divided into groups of zones and the data clock frequency F but not the rate of revolution is varied for recording or reproducing data. With this arrangement, the optical disc 1 can secure an information recording/reproducing region good for random filing on part of it without sacrificing its large data storing capacity.

More specifically, Group B of zones can be used for the data required for establishing a specific operating environment for the user of a personal computer and storing application programs, while Group A of zones are reserved for storing the outcome of operations of the computer.

The zones on the optical disc 1 may be grouped by means of commands sent to the CPU 23 of the optical disc drive from the host computer 70. The zones may be divided into three or more than three groups depending on the application program to be used and the use of the groups may be optimized by varying the data clock frequency F while maintaining the rate of revolution constant or, conversely, by varying the rate of revolution while maintaining the data clock frequency F constant depending on the performance of the hardware.

FIG. 7 is a schematic illustration showing how regions are defined on an optical disc 1 for a second embodiment of the invention. Here, a random file region 75 is arranged along the inner periphery of the disc, while a sequential file region 76 is arranged along the outer periphery to show an arrangement opposite to that of FIG. 5.

In the arrangement of FIG. 5, the random file region is arranged along the outer periphery of the optical disc 1 to reduce its radial length and hence the distance with which the optical head has to move at a stroke, although the waiting time for the optical head 1 for the next motion after the completion of a motion is reduced with the arrangement of FIG. 7 because a high moving velocity can be achieved for a sector in an inner peripheral area.

Note that, with the arrangement of FIG. 7, sequential files are stored in sectors arranged along the outer periphery of the optical disc 1 and this operation of storing files along the outer periphery provides an advantage of reduced deviations of rotatory motion to ensure a smooth operation particularly when a file is stored over a plurality of zones.

Assume that if the optical disc 1 is a new one carrying no information including address data thereon and address data have to be stored there in the first place, a so-called formatting operation has to be carried out to write addresses over the entire surface of the optical disc 1 and this is a rather time-consuming operation. With an optical disc according to the invention, the formatting operation can be significantly alleviated if an inner peripheral region is used for storing random files, leaving an outer peripheral region reserved for sequential files, so that only the random file region is formatted first and addresses may be written in the sequential file region when files are actually stored there.

It may be needless to say that, when the data stored in the sequential file region are replaced by new data, no addresses have to be given anew there just as in the case where the optical disc carries no random file region.

Additionally, the storage areas occupied by sequential files stored on the optical disc 1 with addresses can be identified by registering the last address used for storing sequential files in an information control region specifically provided on the optical disc 1.

If addresses have been already allocated to the storage sectors of the optical disc 1 by the manufacturer in a so-called mastering process, no addresses have to be recorded on the optical disc 1 at the time of storing sequential files. Then, only the random file region may have to be formatted. If a defective storage area is found on the optical disc 1, the address of the area can be registered in the control region so that it may be replaced with another area for the next random file recording operation.

Any of the above described particulars may be selectively used depending on the requirements placed on the optical disc drive by the system comprising the optical disc drive.

FIG. 9 shows graphs illustrating the relationship among the rate of revolution R of the optical disc, the recording/reproducing frequency F and the recording density of the first embodiment and that of the second embodiment.

Figure 9A:
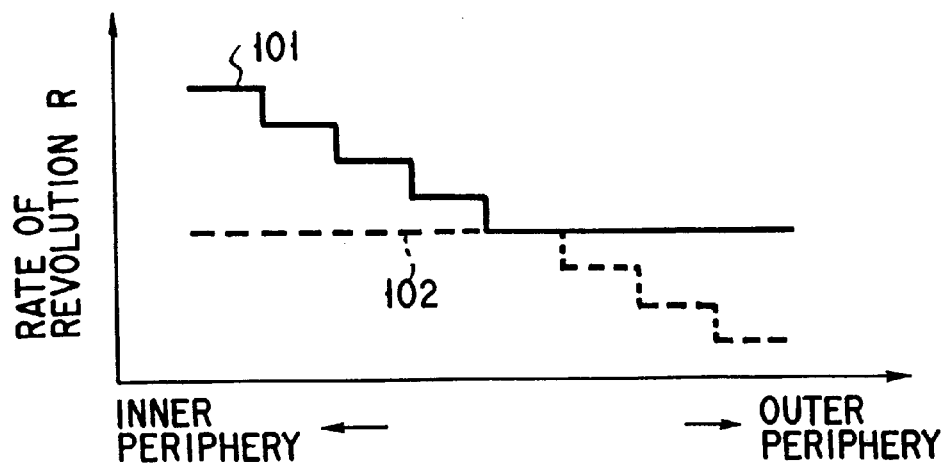
FIGS. 9A–9C show graphs illustrating the relationship among the rate of revolution R of the optical disc, the recording/reproducing frequency F and the recording density d of the first embodiment and that of the second embodiment.
Figure 9B:
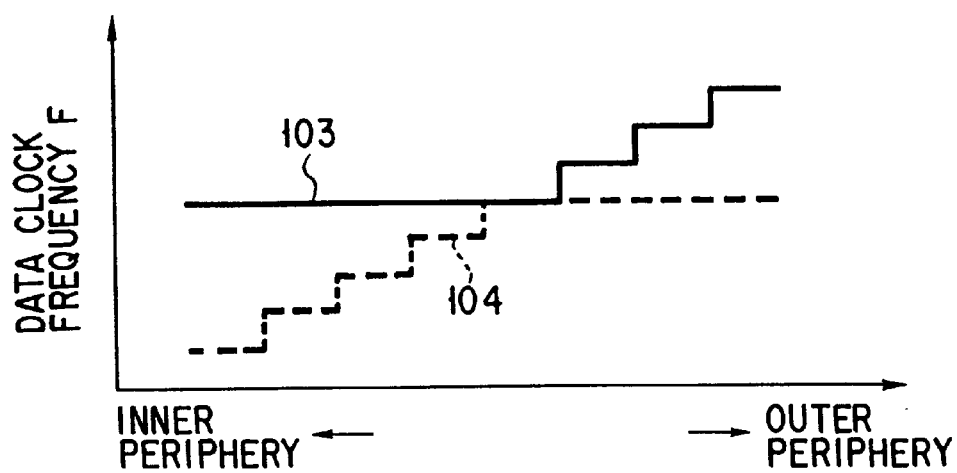
Figure 9C:
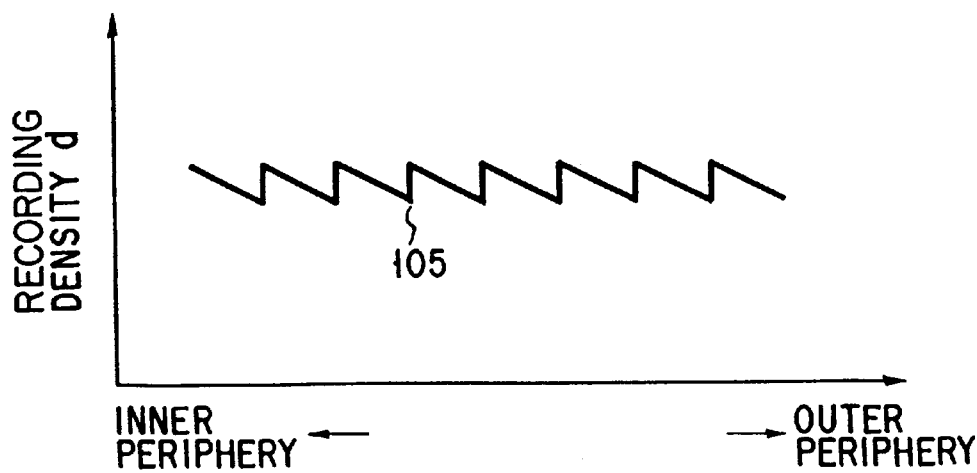

In FIGS. 9A, 9B and 9C are respectively graphs for the rate of revolution R of the optical disc, the recording/reproducing frequency F and the recording density d in terms of the position between the inner periphery and the outer periphery of the optical disc. In the graphs, solid lines 101 and 103 indicate the rate of revolution R and the frequency F of the first embodiment of FIGS. 4A, 4B and 5, while broken lines 102 and 104 indicate the rate of revolution R and the frequency F of the second embodiment of FIG. 7. Solid line 105 indicates the recording density d of the first embodiment and that of the second embodiment, which are basically not different from each other.

Thus, with the first embodiment (101, 103), a variable rate of revolution and a constant recording/reproducing frequency are used in an inner peripheral area to achieve a constant recording density d, whereas a constant rate of revolution and a variable recording/reproducing frequency are used to also achieve a constant recording density d in an outer peripheral area that is substantially equal to the recording density of the inner peripheral area.

With the second embodiment (102, 104), contrary to the first embodiment, a constant rate of revolution and a variable recording/reproducing frequency are used in an inner peripheral area to achieve a constant recording density d, whereas a variable rate of revolution and a constant recording/reproducing frequency are used to also achieve a constant recording density d in an outer peripheral area that is substantially equal to the recording density of the inner peripheral area.

While the memory zones of the optical disc (information recording medium) 1 are divided into two groups, a group for sequential files and a group for random files in each of the above embodiments, they may be divided into two or more than two groups and data may be recorded and reproduced in the MCAV formula as will be described hereinafter.

With this arrangement, the drawback of conventional optical disc drives using the MCAV formula that the recording/reproducing clock shows a large variance between inner and outer peripheral areas is eliminated by dividing the memory zones of the optical disc into an appropriate number of groups, driving the optical disc to revolve at different rates of revolution for different groups and using a variable recording/reproducing clock of the MCAV formula in the groups for recording and reproducing information.

Since the rate of revolution is held constant in each of the groups with this arrangement, it provides the advantage of quick access. Additionally, since the optical disc is radially divided into groups, the optical head of the optical disc drive is required to move only a short distance within a group to the advantage of accessing any data stored there.

Still additionally, the groups may be handled with different volume labels by the host computer to reduce the frequency of inter-group random access and hence improve the performance of the host computer system because, with an information recording medium having a large memory such as an optical disc that is divided into groups of memory zones, each group of zones can still maintain a relatively large memory capacity.

FIG. 8 is a schematic illustration showing how the memory of an optical disc is divided into a total of four groups (volumes).

Referring to FIG. 8, Group 1, or Region 77, is located in an area closest to the inner periphery of the optical disc and comprises Zone 1 through 7. It has a memory capacity of about 644 MB. For the operation of recording/reproducing data in this region, the rate of revolution of the motor is set to a constant value of 2,600 r.p.m. by the motor control clock, while the data clock frequency F (or the rate of data recording/reproduction) is made to vary between 30 MHz and 42 MHz depending on the zone where the current address for data recording/reproduction is located. Thus, in this group, data are accessed by varying only the data clock frequency F. holding the rate of revolution R of the optical disc constant, and moving the optical head by a given distance, The time required for the optical head to move at a stroke can be remarkably reduced because the region has a radial distance of only 11.366 m in the total radial distance of the memory area of the optical disc of 34 mm.

Group 2, or Region 78, is located next to Group 1 on the optical disc and comprises Zone 8 through 13. It has a memory capacity of about 648 MB. For the operation of recording/reproducing data in this region, the rate of revolution of the motor is set to a constant value of 1,764.93 r.p.m. by the motor control clock, while the data clock frequency F (or the rate of data recording/reproduction) is made to vary between 30 MHz and 36 MHz depending on the zone where the current address for data recording/reproduction is located. Thus, in this group, data are accessed by varying only the data clock frequency F, holding the rate of revolution R of the optical disc constant, and moving the optical head by a given distance. The time required for the optical head to move at a stroke can be remarkably reduced because the region has a radial distance of only 8.5248 m in the total radial distance of the memory area of the optical disc of 34 mm.

Group 3, or Region 79, is located next to Group 2 on the optical disc and comprises Zone 14 through 18. It has a memory capacity of about 648 MB. For the operation of recording/reproducing data in this region, the rate of revolution of the motor is set to a constant value of 1,421.70 r.p.m. by the motor control clock, while the data clock frequency F (or the rate of data recording/reproduction) is made to vary between 30 MHz and 33.9 MHz depending on the zone where the current address for data recording/reproduction is located. Thus, in this group, data are accessed by varying only the data clock frequency F, holding the rate of revolution R of the optical disc constant, and moving the optical head by a given distance. The time required for the optical head to move at a stroke can be remarkably reduced because the region has a radial distance of only 7.104 m in the total radial distance of the memory area of the optical disc of 34 mm.

Group 4, or Region 80, is located in an area closest to the outer periphery of the optical disc and comprises Zone 19 through 23. It has a memory capacity of about 725 MB. For the operation of recording/reproducing data in this region, the rate of revolution of the motor is set to a constant value of 1,223.64 r.p.m. by the motor control clock, while the data clock frequency F (or the rate of data recording/reproduction) is made to vary between 30 MHz and 33.3 MHz depending on the zone where the current address for data recording/reproduction is located. Thus, in this group, data are accessed by varying only the data clock frequency F, holding the rate of revolution R of the optical disc constant, and moving the optical head by a given distance. The time required for the optical head to move at a stroke can be remarkably reduced because the region has a radial distance of only 6.99744 m in the total radial distance of the memory area of the optical disc of 34 mm.

If data on the optical disc have to be accessed across the groups (1, 2, 3 and 4), the access time is inevitably prolonged because the rate of revolution R of the motor has to be altered. However, this sort of inconvenience can be avoided by defining the groups in a way suited most for file management for the host computer to reduce the frequency with which inter-group access is made under the control of the host computer. Such grouping can be realized by using partitions or by dividing volumes.

As described above, the large memory capacity of the optical disc can be fully exploited by using an optical disc and an optical disc drive according to the invention in combination with a host computer to improve the performance of the entire computer system.

Thus, according to the invention, the file storage area of an optical disc can be optimally configured for the computer system incorporating it by means of any of the above described embodiments of the invention. Such a configuration of the file storage area involves a number of regions produced by dividing the storage area and having desire storage capacities and characteristics.

Therefore, the invention provides an information recording/reproducing apparatus that can use a selected information recording format that meets the capacity related requirements of recording operation as well as an information recording medium that can be used for such an apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus, comprising:

optical disc holding means for holding an optical disc which records and reproduces data, the optical disc having first, second, third, and fourth regions of data;

revolution control means for executing revolution control of the optical disc at one of the first, second, third and fourth rates of revolution for each corresponding first, second, third and fourth regions;

the first region being formatted according to an M-CAV system so that said optical disc is rotated at a first rate of revolution when reading/writing data in the first region, and having a first plurality of zones, each zone of said first plurality of zones having its own clock frequency so that a recording density remains constant, the second region being located adjacent to the first region and being formatted according to an M-CAV system so that said optical disc is rotated at a second rate of revolution that is different from the first rate of revolution when reading/writing data in the second region, and having a second plurality of zones, each zone of said second plurality of zones having its own clock frequency so that a recording density remains constant, the third region being located adjacent to the second region and being formatted according to an M-CAV system so that said optical disc is rotated at a third rate of revolution that is different from the first and second rates of revolution when reading/writing data in the third region, and having a third plurality of zones, each zone of said third plurality of zones having its own clock frequency so that a recording density remains constant, and the fourth region being located adjacent to the third region and being a region formatted according to an M-CAV system so that said optical disc is rotated at a fourth rate of revolution that is different from the first, second, and third rates of revolution when reading/writing data in the fourth region, and having a fourth plurality of zones, each zone of said fourth plurality of zones having its own clock frequency so that a recording density remains constant, and reproducing means for reproducing information stored in each of the zones in each of the first, second, third and fourth regions in accordance with the clock frequency of the corresponding zone.

2. A data processing apparatus, comprising:

optical disc holding means for holding an optical disc which records and reproduces data, the optical disc having first and second regions of data;

revolution control means for executing revolution control of the optical disc at one of the first and second rates of revolution for each corresponding first and second regions;

the first region being formatted according to an M-CAV system so that said optical disk is rotated at a first rate of revolution when reading/writing data in the first region, and having a first plurality of zones, each zone of said first plurality of zones having its own clock frequency so that a recording density remains constant, and the second region being located adjacent to the first region and being formatted according to an M-CAV system so that said optical disc is rotated at a second rate of revolution that is different from the first rate of revolution when reading/writing data in the second region, and having a second plurality of zones, each zone of said second plurality of zones having its own clock frequency so that a recording density remains constant, and reproducing means for reproducing information stored in each of the zones in each of the first and second regions in accordance with the clock frequency of the corresponding zone.

* * * * *